INVENTORS
M. L. JOHNSON
D. E. LUPFER
BY
*Young & Quigg*
ATTORNEYS

United States Patent Office 3,449,215
Patented June 10, 1969

3,449,215
DISTILLATION COLUMN CONTROL WITH BIASING SIGNAL AS FEEDBACK CORRECTION FOR COMPUTED PRODUCT FLOW RATE
Merion L. Johnson and Dale E. Lupfer, Bartlesville, Okla., assignors to Phillips Petroleum Company, a corporation of Delaware
Filed Sept. 8, 1966, Ser. No. 577,948
Int. Cl. B01d 3/42
U.S. Cl. 203—3                    12 Claims

ABSTRACT OF THE DISCLOSURE

In a fractionation process in which a product flow rate is predicted from feed analysis and other factors, a signal representative of the computed product flow rate is used to control the product flow rate, and an analyzer determines the concentration of a key component in a product stream and accordingly provides a biasing signal for the computed product flow rate signal as a feedback correction thereto, an additional correction to the feedback signal is made to increase the stability of the system and to prevent conditions such as oscillation in the system which can be caused by an uncorrected feedback signal when operating or feed conditions vary.

---

Figure 1:
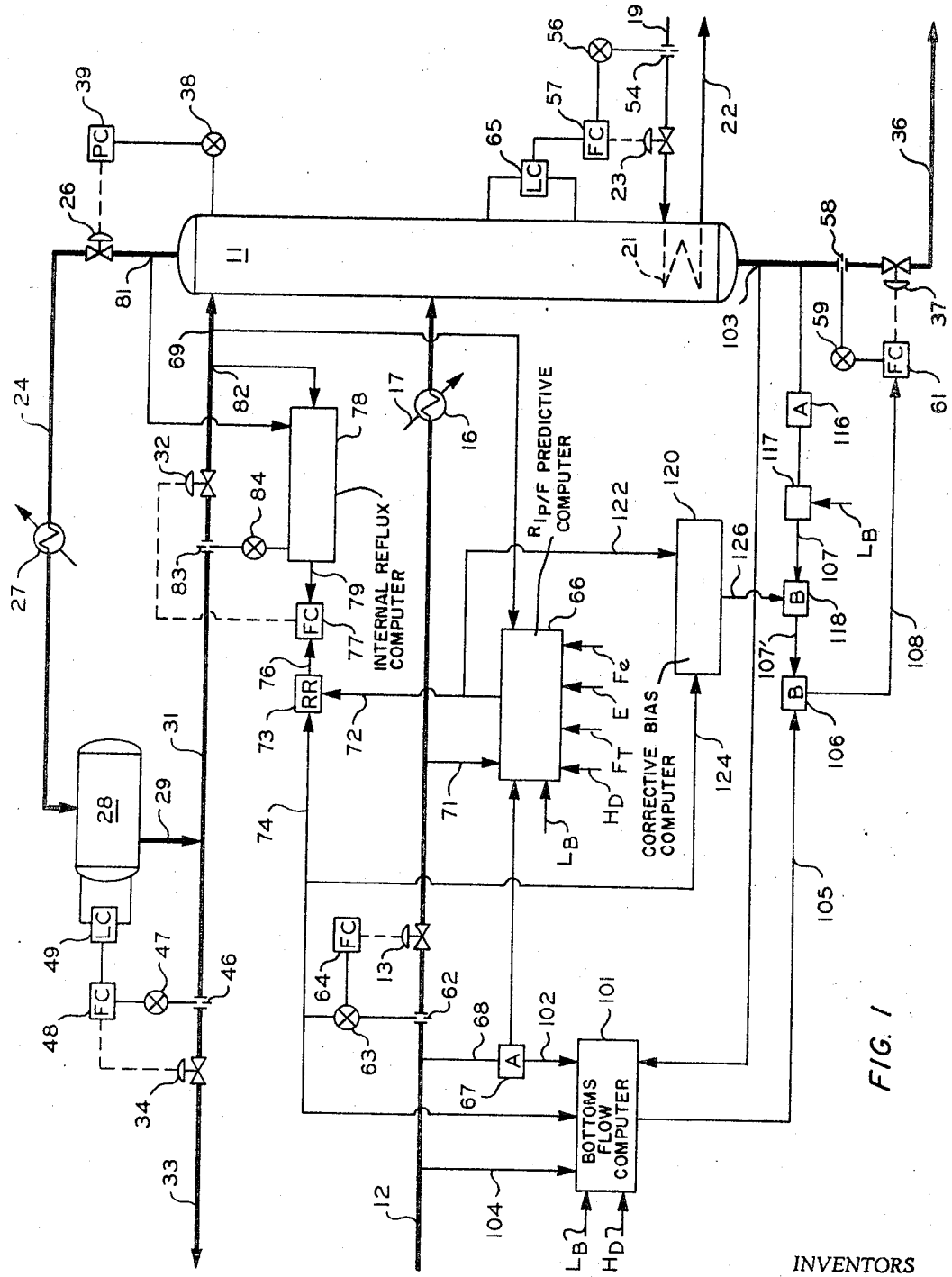

This invention relates to a method and apparatus for controlling a distillation column. In one of its aspects it relates to a predictive computer control system for a distillation column in which a product flow rate is computed from feed analysis, flow rate and desired product compositions wherein an analyzer in either product stream is used to provide a corrective signal to be combined with the computed signal and the composite signal is used to control the flow rate of the product stream, and wherein a computed compensation is applied to the corrective signal to achieve the proper corrective action regardless of the process operating conditions and, therefore, maintain high quality feedback control.

There is ever-increasing activity in the art of fractional distillation to optimize the operation of a distillation column so that products with desired specifications can be produced for minimum operating costs at the column's optimum design value. Optimizing the operation of a distillation column is complicated, difficult and uncertain because of the column's numerous degrees of freedom, which are characterized as independent input variables, some of which are controllable (e.g., feed temperature and reboiler heat flow), and others of which are uncontrollable (e.g., ambient temperature and feed composition). Many methods and means have been proposed, patented or used in an effort to reduce the column's degrees of freedom. However, there still remains a need for a suitable automatic method and means for optimizing the control of a distillation column to produce selected product specifications with minimum utilities consumption and maximum utilization of the unit.

One of the most important input variables of a distillation column is reflux flow rate. In striving for optimum operation, this variable must be manipulated, particularly where there occur disturbances in certain uncontrollable input variables, such as ambient temperature, cooling water, cooling air, and feed composition. This variable, reflux flow rate, is automatically manipulated, as uncontrollable variables fluctuate, to maintain the specified operation of the column at optimum levels. Bottom product flow rate is another important input variable which must be manipulated to compensate for disturbances in such variables as feed composition and feed flow, and the subject invention is concerned with control loop dynamic correction of the automatic manipulation of bottom product fow rate in combination with the automatic manipulation of reflux flow rate.

In copending application Ser. No. 189,375, filed Apr. 23, 1962, United States Patent Number 3,296,097, issued Jan. 3, 1967, there is disclosed and claimed a method and apparatus for controlling a fractional distillation column in which a bottom product flow rate is predicted from feed analysis and other factors, a signal representative of the computed product flow rate is used to control the product flow rate, an analyzer determines the concentration of a key component in a product stream and accordingly provides a biasing signal for the computed product flow rate signal as a feedback correction thereto. In using this system, the conditions are sometimes such that the product flow rate will be over-corrected for changes in product composition. This over-correction causes the flow rate to oscillate because of too great a value of loop gain, thus causing oscillatory operation of the distillation column. In other circumstances, the conditions are such that the corrective signal to the bottom product flow signal is not great enough to produce the desired changes because of too small a value of loop gain and the column adjusts to changes too slowly. It can be seen in both of these circumstances that a loss of control accuracy can result, causing inefficient operation of the system.

We have now discovered that the problems with the aforementioned system can be substantially eliminated if the gain of the control loop providing the corrective signal which is combined with the computed control signal is maintained substantially constant, i.e. an increment of change in loop input causes a corresponding uniform increment of change in loop output over a wide operating range. Thus, a compensating signal is applied to the corrective signal to maintain the gain of the corrective signal control loop constant. The gain adjustment for the corrective signal can be computed from measured values.

By various aspects of this invention, one or more of the following, or other, objects can be obtained.

It is an object of this invention to provide a improved control method and apparatus for the operation of a distillation column.

It is a further object of this invention to eliminate undesirable oscillatory and over damped operation of a control system for a fractional distillation column, the poor dynamic behavior being due to over—or under—correction in the control system.

It is a still further object of this invention to provide a control method and apparatus for a fractional distillation column in which the column product streams are adjusted to produce a desired flow rate of product of a desired composition without experiencing oscillatory or over damped behavior of the fractionation column.

Other aspects, objects, and the several advantages of this invention are apparent to one skilled in the art from a study of this disclosure, the drawings, and the appended claims.

According to the invention, there is provided an improvement in a control system in which a product flow rate is computed and the computed value of the product flow rate is used to adjust the rate of product withdrawal from a fractional distillation column, an analyzer is used to determine the composition of a product stream, the analyzed composition of the product stream is compared with a desired value, and a signal related to the difference between the measured and desired concentration is combined with a signal representative of the computed product flow rate as a correction thereto. The improvement comprises applying, to the signal related to the difference between the desired concentration and the measured concentration, a compensation to maintain the gain of the corrective feedback loop constant.

Figure 2:
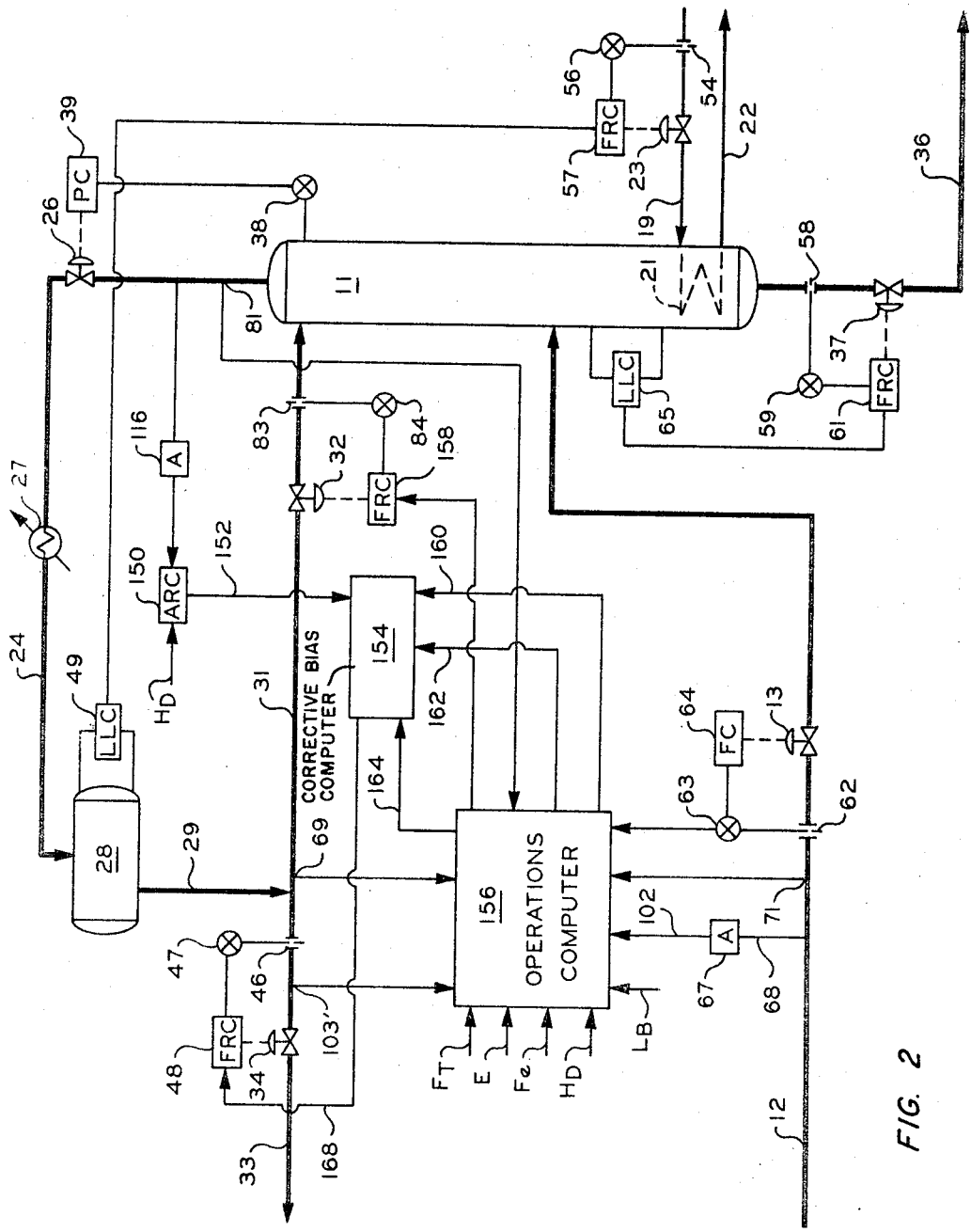
Figure 3:
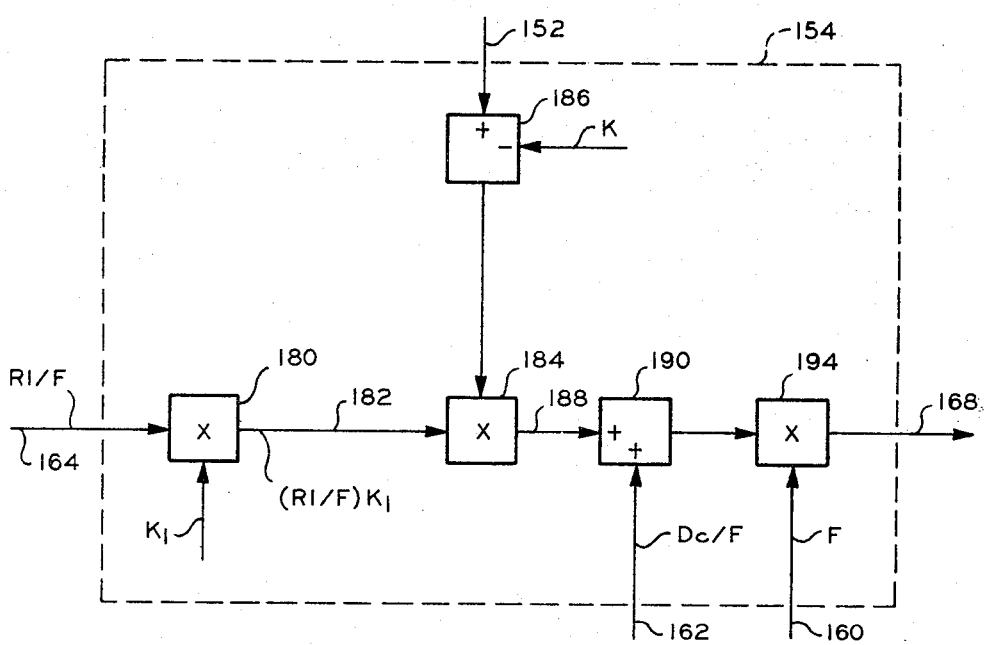

The invention will now be described and exemplified with reference to the accompanying drawings in which FIGURE 1 is a schematic representation of a distillation control system using a control system according to the invention; FIGURE 2 is a schematic representation of a fractional distillation system as shown in FIGURE 1 employing a modification of the invention; FIGURE 3 is a schematic diagram of certain mathematical analog instrumentation shown in FIGURE 2.

To provide a setting or background for the subject invention, there will be described in brief fashion a conventional distillation column, illustrated in FIGURE 1.

In FIGURE 1, there is shown a conventional fractional distillation column 11, which can be provided with a plurality of vertically spaced liquid-vapor contact trays (not shown). Feed comprising a multi-component mixture to be separated is supplied via line 12 and introduced onto a feed tray in column 11 located at an intermediate level therein. Feed line 12 is associated with an indirect heat exchanger or preheater 16. An indirect heat exchange medium such as steam is supplied via line 17 to preheater 16. Heat is supplied to the kettle of column 11 by circulation of steam or other heat exchange medium from supply line 19 through reboiler coil 21, the condensed heat exchange medium being withdrawn from the coil via line 22. The flow rate of the heat exchange medium in line 19 is controlled by valve 23. Vapors are removed from the top of column 11 through overhead line 24, the flow rate being controlled by valve 26 and passed through a cooler 27 such as an air-cooled condenser, the resulting liquid being passed to an accumulator 28. Liquid distillate in accumulator 28 is withdrawn via line 29, and a portion of this withdrawn liquid is recycled via line 31 as external reflux to the top of column 11, the flow rate of the external reflux being controlled by valve 32. The balance of the liquid distillate withdrawn from accumulator 29 is removed from the system through line 33 and yielded as distillate product, the flow rate being controlled by valve 34. Bottom product is withdrawn from the kettle of column 11 via line 36, the flow rate of the bottom product being controlled by valve 37.

Thus far, there has been described a conventional distillation column, which by itself does not constitute the subject invention. The object of the distillation column, of course, is to separate the multi-component feed into at least two fractions, an overhead and a bottom product. The light components of the feed will appear mainly in the overhead and the heavy components of the feed will appear mainly in the bottom product. The light components will comprise a light key component and components lighter than the light key component, while the heavy components will comprise a heavy key component and components heavier than the heavy key component. Since perfect separation between the two key components is impossible, some of the heavy key component will appear as an impurity in the overhead (and thus in the distillate product) and some of the light key component will appear as an impurity in the bottom product. However, the amounts of these impurities can be kept down to desired levels by proper operation of the column. The operation of a distillation column can be specified by specifying the fraction ($H_D$) of the heavy key component desired in the overhead (or distillate product) and the fraction ($L_B$) of the light key component desired in the bottom product. If these specifications are to be met at minimum operating costs and at maximum utilization of the column, corrective actions must be taken at the proper time and rate to minimize the effects of disturbances on product compositions and flows.

The operation of such a distillation column is affected by disturbances in independent input variables (i.e., variables which can change or be changed independently without any effect of one upon the other). Such independent variables can either be manipulated or are uncontrolled. Feed composition and ambient temperature are examples of independent input variables which cannot be altered or controlled (within the limits of the process in question). Feed temperature, reflux temperature, and reboiler steam flow are examples of manipulated or controlled independent input variables. Then there are dependent output variables, such as the purities of the distillate and bottom products, which are a function or result of the independent variables. As should be evident, a distillation column has numerous degrees of freedom and any significant step in the control of the operation of a distillation column must reduce these degrees of freedom.

The degrees of freedom of the distillation column of FIGURE 1 can be reduced by providing it with minimum controls well known in the art. Referring now to the drawings, a constant pressure in the top of column 11 can be maintained by an assemly comprising a pressure transducer 38 and pressure controller 39 in conjunction with control valve 26. The flow rate in distillate product line 33 can be controlled by an assembly comprising orifice plate 46, differential pressure transducer 47 and flow controller 48 in conjunction with control valve 34, flow controller 48 being manipulated or cascaded by a liquid level controller 49 associated with accumulator 28, so as to maintain a constant liquid level in the accumulator. The volume flow rate of steam in line 19 can be controlled by an assembly comprising orifice plate 54, differential pressure transducer 56 and flow controller 57 in conjunction with flow control valve 23. The flow rate of bottom product in line 36 can be controlled by an assembly comprising orifice plate 58, differential pressure transducer 59 and flow controller 61 in conjunction with control valve 37. Similarly, the flow rate of feed in line 12 can be controlled by an assembly comprising orifice plate 62, differential pressure transducer 63 and flow controller 64 in conjunction with flow control valve 13. Further reduction in the degrees of freedom in the column can be accomplished by using the level of liquid in the kettle of column 11 to manipulated the volume of steam passed via line 19 to the reboiler. This can be done by an assembly comprising a liquid level controller 65 which manipulates the setpoint of flow controller 57. The use of these minimum control features of the prior art reduces the number of the degrees of freedom of the column. However, many input variables can still affect the operation.

An input variable of primary concern in this invention is the reflux flow rate. Uncontrolled fluctuations in this variable can affect purity and operation costs. But in speaking about reflux flow rate, it is necessary to distinguish between external reflux flow rate and internal reflux flow rate. The external reflux flow rate is the flow rate of liquid returned to the top of the column, i.e., the flow rate of liquid in line 31 of FIGURE 1 controlled by valve 32. The internal reflux flow rate is the flow rate of liquid leaving the top tray and it is the sum of the external reflux flow rate plus the flow rate of that liquid which results from the condensation of vapors in the top of the column upon contact with the cool external reflux. Holding the flow rate of the external reflux constant is no guarantee that the internal reflux remains constant. Thus, for efficient operation it is the internal reflux flow rate which must be maintained at the optimum value. Unfortunately, it is difficult to measure the actual flow of internal reflux because there is no economical way to install an orifice plate or primary flow measuring device in the column.

Fluctuations or changes in the temperature of the external reflux and in the composition of the feed exert an effect on the liquid-vapor mass transfer taking place in the column. For any external reflux temperature and feed composition there will be an optimum internal reflux flow rate required to make a specified separation. Variations in the temperature of the external reflux are usually due to fluctuations in ambient temperature. This is especially true when air-cooled condensers are used to condense the overhead vapors of the column. Ambient temperature changes, for example due to sudden rainstorms or drop in temperature at night, produce changes in the temperature of the external reflux liquid being returned to the top of the column. This temperature variation affects the internal reflux flow rate in the column. For example, if the external reflux temperature drops, this means that more of the vapors in the top of the column will be condensed, resulting in a decrease in overhead product and an increase in bottom product with a simultaneous unnecessary increase in the purity of the overhead product and an undesirable decrease in bottom product purity.

There will now be described how the internal reflux flow rate of a distillation column can be predicted and how the external flow rate can be accordingly manipulated to maintain the internal reflux flow rate at a desired value, so that distillate and bottom products with specified purities can be produced.

Briefly, measurements are made of feed flow rate and feed components, signals are produced proportional to such measurements and these signals are combined with other signals proportional to certain constants in a predictive, statistically-derived equation for internal reflux flow rate based on the expression:

$$R_{Ip} = f(F, F_c, E, F_T, F_e, H_D, L_B) \quad (1)$$

where:

$R_{Ip}$=predicted internal reflux flow rate (volume/unit time)
$F$=feed flow rate (volume/unit time)
$F_c$=generic symbol for components in feed, each expressed as a liquid volume fraction of feed
$E$=average column tray efficiency
$F_e$=feed enthalpy (b.t.u./lb.)
$F_T$=feed tray (numbering trays from top of column)
$H_D$=specified liquid volume fraction of heavy key in distillate product
$L_B$=specified liquid volume fraction of light key in bottom product A signal proportional to the predicted internal reflux flow rate, or a signal proportional to the ratio of predicted internal reflux flow rate-to-feed flow rate, can be recorded by a recorder (not shown) and used for monitoring purposes only, but preferably such signal is fed forward as a setpoint-adjusting signal to trim the setpoints of downstream process variable controllers, such as the flow rate controller used to manipulate external reflux flow rate. This predictive corrective action compensates for changes in feed composition and feed flow rate, and the corrective action is taken at the proper rate and time to minimize the effect of such changes on the desired product purities. The system used to make this corrective action is called a predictive or feed-forward control system.

The exact equation used to predict what the internal reflux flow rate of the distillation column should be to obtain a specified separation will vary. But, having determined what independent variables are significantly related to internal reflux, it is possible by straight-forward, well-known statistical methodology to determine how these significant variables can be combined in an equation to predict internal reflux flow rate with specified limits of accuracy to compensate for change in feed composition and feed flow. One means of developing such an equation is the response surface experiment or empirical surface study, wherein the approximate value of internal reflux is found on the basis of the independent variables. This empirical study of internal reflux will be adequate when the ranges of the independent variables are predetermined, and when the effects of other factors are known to be insignificant or constant. The procedure for determining the response surface is straight-forward. For this purpose, the Box-Wilson central composite designs will be quite useful since they will determine the curvature in the response surface in the region of interest. These designs provide data estimating linear, quadratic, and two-factor interaction effects by measuring each variable at five different levels, and, where plant data is used rather than theoretical data, repeating a single observation several times in order to estimate the non-reproducibility of the measurements. When the functional relationship between internal reflux and the independent variables has thus been determined, it then is necessary to determine the coefficients in the predictive equation. One common method of analysis which can be used to determine these coefficients is called regression analysis. Regression analysis assumes a relationship between the dependent variable (internal reflux) and each term in the proposed equation, and determines the best set of coefficients for the predictive equation. The criterion for calculating the best set of constants for the equation is Gauss' familiar Principle of Least Squares, and it determines the percent of the variation in internal reflux that is explained by the equation, and establishes the precision of the equation in terms of Standard Error of Estimate.

The following summarizes the statistical approach in deriving a predictive equation for internal reflux:

(1) Select all independent variables believed to exert a significant effect upon internal reflux;

(2) Design and carry out screening experiments to test for the significant effects of the independent variables;

(3) Perform a correlation analysis to identify variables which should be represented in a predictive equation;

(4) Perform a surface response experiment either on the actual operating column or by tray-to-tray calculations (e.g., on a digital computer) to obtain data, using a suitable experimental design for data gathering, such as the Box-Wilson composite design; and (5) Using regression analysis, determine the best set of coefficients for an assumed form of the predictive equation and determine the precision of the equation in terms of Coefficient of Determination and Standard Error of Estimate.

Those skilled in the art of statistics will be able to determine the predictive equation for internal reflux for any distillation column, in view of the foregoing discussion.

An example of how a predictive equation is synthesized using the above method as relates to a debutanizer column can be seen by reference to copending application Ser. No. 189,375, filed Apr. 23, 1962. United States Patent Number 3,296,097, issued Jan. 3, 1967. By these statistical methods, the internal reflux can be defined by the following expression:

$$R_{Ip} = f(C_3, iC_4, nC_4, iC_5, nC_5, F, E, F_T, F_e, H_D, L_B) \quad (2)$$

where:

$R_{Ip}$=predicted internal reflux flow rate (volume/unit time)
$C_3$=liquid volume fraction of propane in feed
$iC_4$=liquid volume fraction of isobutane in feed
$nC_4$=liquid volume fraction of normal butane in feed
$iC_5$=liquid volume fraction of isopentane in feed
$nC_5$=liquid volume fraction of normal pentane in feed
$F$=feed flow rate (volume/unit time)
$E$=average column tray efficiency
$F_T$=feed tray location (trays numbered from top of column)
$F_e$=feed enthalpy (b.t.u./lb.)
$H_D$=specified liquid volume percent fraction of isopentane desired in distillate
$L_B$=specified liquid volume percent fraction of normal butane desired in bottom product Equation 2 shows that the value for $R_{Ip}$ is a function of the specified product purities, $H_D$ and $L_B$, feed enthalpy $F_e$, feed tray location $F_T$, average column tray efficiency $E$, feed flow $F$, and feed composition ($C_3$, $iC_4$, $nC_4$, $iC_5$, $nC_5$). A study of the feed stream indicated that the composition variables could be simplified. A specific relationship was found between isopentane ($iC_5$) and normal pentane ($nC_5$). The relationship was expressed by an independent equation which states that the ratio of these two components is constant. Only one of the two components needed to be included as a variable in the internal reflux equation. The feed stream component variables were further simplified by treating the sum of propane ($C_3$) and isobutane ($iC_4$) as a single variable ($C_3+iC_4$). Another variable included is the average tray efficiency (E). The ratio of internal reflux flow ($R_{Ip}$) to feed flow F is a function of all other variables of the system. The equation was developed for the ratio $R_{Ip}$ to F:

$$\frac{R_{Ip}}{F} = f[(C_3+iC_4), nC_4, iC_5, E, F_T, F_e, H_D, L_B] \quad (3)$$

Based on data indicative of the operating parameters discussed above and expression (3), the following predictive statistically-derived equation was developed:

$$\frac{R_{Ip}}{F} = K_1 + iC_5[K_2 + K_3(nC_4) + K_4(iC_5) + K_5(C_3+iC_4)] + K_6(C_3+iC_4) \quad (4)$$

where:

$K_1 = A_1 + A_2(F_T)^2 + A_3E + A_4(E)^2 + A_{23}(F_e)^2$
  $+ H_D[A_9 + A_{10}(H_D) + A_{11}(L_B) + A_{12}(E)]$
  $+ L_B[A_5(L_B) + A_6(E) + A_7 + A_8(F_T)]$
$K_2 = A_{13}(L_B) + A_{14}(E)(H_D) + A_{15}(E) + A_{17}(H_D)$
  $+ A_{16}(E)(F_T)$
$K_3 = A_{18} + A_{19}(E)$
$K_4 = A_{20}$
$K_5 = A_{21}(E)$
$K_6 = A_{22}(F_e)$ $A_1$ through $A_{23}$ = constants statistically defined in the derivation of Equation 4 to minimize error between the data and Equation 4.

Since volume flow measurements are involved, it was desirable to refer the reflux volume flow measurement to a temperature base equal to the feed temperature. With this correction, Equation 4 becomes:

$$\frac{R_{Ip}}{F} = (1+K_R\Delta T')[K_1 + iC_5[K_2 + K_3(nC_4) + K_4(iC_5) + K_5(C_3+iC_4)] + K_6(C_3+iC_4)] \quad (5)$$

where:

$K_R$ = coefficient of thermal expansion of external reflux (change in volume/unit volume/° F.)
$\Delta T' = T_R - T_F$
$T_R$ = temperature of external reflux, ° F.
$T_F$ = temperature of feed upstream of economizer, ° F.

Examination of Equation 5 shows that it is necessary to measure the temperature $T_R$ of the external reflux, the temperature $T_F$ of the feed stream upstream of the economizer, and the fractions of feed components $C_3$, $iC_4$, $nC_4$, $iC_5$. Feed enthalpy $F_e$, tray efficiency E, and feed tray $F_T$ are inserted as constants. E is adjusted when necessary to up-date the equation due to changes in column efficiency because of deposition of coke, etc.

Referring again to FIGURE 1, we have designated as 66 a computer which can be used to automatically solve Equation 5 for a predictive value of internal reflux-to-feed flow ratio. Computer 66 is associated with an analyzer 67, the latter being in communication with feed line 12 by reason of a sampling line 68. Analyzer 67 comprises any suitable instrument which continuously or substantially continuously (i.e., rapid cycle) analyzes the feed and determines the relative amounts, e.g., liquid volume percent, of the components in the feed which function as independent variables in the predictive equation, and produces signals proportional thereto. Analyzer 67, such as described in I.S.A. Journal, vol. 5, No. 10, p. 28, October 1958, preferably comprises a high speed chromatographic analyzer having a sampling valve, motor detector, chromatographic column, programmer, and a peak reader, the latter functioning to read the peak height of the components, giving an equivalent output signal which is suitable for control purposes. In operation, sample flows continuously through the analyzer. At a signal from the programmer, a measured volume of sample is flushed into the chromatographic column. When the component arrives at the detector, the resulting signal is measured, amplified, and stored until the next signal when the sequence is repeated. The stored signal is a continuous output signal analogous to the amount of the components present. Such an analyzer and the operation thereof are well known in the art.

Specifications $L_B$ and $H_D$ for the column operation as well as constants $F_T$, E, and $F_e$, can be dialed into computer 66. The temperature $T_R$ of the external reflux can be measured by a suitable thermocouple 69 in external reflux line 31 and transmitted to computer 66. Temperature $T_F$ of the feed can be likewise measured by a suitable thermocouple 71 in feed line 12 and transmitted to computer 66. The predicted ratio $R_{Ip}/F$ computed in computer 66 is transmitted as an output signal via signal line 72 to a ratio relay 73 (or multiplier) where it is multiplied by a signal proportional to feed flow rate F, the latter being transmitted from a linear flow transmitter 63 via signal line 74. The resultant signal from ratio relay 73, proportional to $R_{Ip}$ is then transmitted by signal line 76 to a flow controller 77 where it is compared with a computed or inferentially measured value of the actual internal reflux flow rate $R_{Im}$ in column 11, the actual internal reflux value being computed in computer 78 and transmitted by signal line 79 to flow controller 77. If the predicted internal reflux flow rate $R_{Ip}$ is larger than the measured internal reflux flow rate $R_{Im}$, flow controller 77 accordingly will increase the flow rate of external reflux flowing in line 31 by further opening flow control valve 32. Conversely, if the predicted internal reflux flow rate $R_{Ip}$ is less than the measured internal reflux flow rate $R_{Im}$, flow controller 77 will accordingly decrease the flow rate of external reflux in line 31 by decreasing the extent to which flow control valve 32 is opened. Accordingly, the internal reflux flow rate of the column is manipulated. Thus, fluctuations in feed compositions are compensated for by changing the internal reflux flow rate indirectly by manipulating the external reflux flow rate. In addition, if the measured internal reflux flow rate $R_{Im}$ deviates from the predicted internal reflux flow rate $R_{Ip}$ due to external reflux temperature changes, flow controller 77 is adjusted to change the external reflux flow rate and bring the measured internal reflux flow rate $R_{Im}$ back to the predicted internal reflux flow rate $R_{Ip}$ supplied as a setpoint signal 76 to flow controller 77.

The preferred manner of making the measurement or computation of the actual internal reflux flow rate $R_{Im}$ is that described and claimed in U.S. Patent No. 3,018,229, issued Jan. 23, 1962, to Lyman W. Morgan. Briefly, this measurement of the actual internal reflux is accomplished by solution of the equation:

$$R_{Im} = R_{Em}(1+K\Delta T) \quad (6)$$

where:

$R_{Im}$ = computed actual internal reflux flow rate (unit volume/unit time)
$R_{Em}$ = measured external reflux flow rate (unit volume/ unit time)
$K = C_p/\lambda$
$C_p$ = specific heat of external reflux (or liquid on top tray) (B.t.u./unit volume/° F.)
$\lambda$ = heat of vaporization of liquid on top tray (B.t.u./unit volume)
$\Delta T = T_O - T_R$
$T_O$ = temperature of overhead vapor (or liquid on top tray) (° F.)
$T_R$ = temperature of external reflux (° F.)

Referring again to FIGURE 1, the computation of the actual internal reflux flow rate $R_{Im}$ can be accomplished by computer 78. The temperature $T_O$ is detected by a thermocouple 81 in overhead line 24, and the temperature $T_R$ is measured by a thermocouple 82 in external reflux line 31, and these temperatures are transmitted to computer 78. In addition, an orifice plate 83 in external reflux line 31 together with a flow transducer 84 provides a means for measuring the external reflux flow rate $R_{Em}$, the differential pressure across orifice plate 83 being transmitted by transmitter 84 to computer 78 as a signal proportional to said differential pressure.

The solution of Equation 5 can be done in any combination of analog or digital instruments such as those disclosed in copending application Ser. No. 189,375, filed Apr. 23, 1962, U.S. Patent No. 3,296,097, issued Jan. 3, 1967, by the method described in said copending application.

As mantioned hereinbefore, the bottom product flow rate is another important input variable which can be manipulated to compensate for disturbances in such variables as feed composition and feed flow, and the automatic manipulation of bottom product flow rate in combination with the automatic manipulation of reflux flow rate further reduces the effects of disturbances on column performance. The bottom product flow is preferably computed by that system disclosed and claimed in Lupfer 3,224,947. We have illustrated in FIGURE 1 a bottom product flow computer 101. The general equation for bottom flow rate can be expressed as:

$$B = f(F_c, F, H_D, L_B) \quad (7)$$

where:

$B$=predicted flow rate of bottom product, (volume/unit time)
$F_c$=generic symbol for the sum of the light key component and components lighter than the light key, each expressed as a liquid volume fraction of feed
$F$=feed flow rate (volume/unit time)
$H_D$=specified fraction of heavy key in distillate (liquid volume decimal fraction)
$L_B$=specified fraction of light key in bottoms product (liquid volume decimal fraction)

In the example where column 11 of FIGURE 1 is used as a debutanizer, expression (7) becomes:

$$B = f(C_3, iC_4, nC_4, F, H_D, L_B) \quad (8)$$

where:

$H_D$=specified fraction of isopentane in distillate (liquid volume decimal fraction)
$L_B$=specified fraction of normal butane in bottom product (liquid volume decimal fraction)

Thus, like the Equation 1 for predicted internal reflux flow rate to feed flow rate, the equation for bottom product flow rate $B$ required to maintain product purities is a function of the specified product purities $H_D$ and $L_B$, feed flow $F$, and feed composition ($C_3$, $iC_4$, $nC_4$). In developing the predictive equation for $B$ by a material balance, the four variables $iC_5$, $nC_5$, $F_T$, and $F_E$ are not required. The exact bottom product flow rate predictive equation can be derived from a material balance, and this equation is expressed as:

$$B = F \left( \frac{K_8 - C_3 - iC_4 - nC_4}{K_9} \right) \quad (9)$$

where:

$B$=predicted volume flow rate of bottom product if flow is measured at temperature equal to feed temperature
$F$=volume flow rate of feed when measured at existing feed temperature
$K_8 = 1 - H_D$
$K_9 = 1 - H_D - L_B$ Equation 9 shows that bottom product flow rate can be computed if $H_D$ and $L_B$ are specified and if the feed flow $F$ and feed components $C_3$, $iC_4$ and $nC_4$ are known. Computer 101 is applied to manipulate B as a function of these variables. This computer 101 has the following inputs: feed composition, determined by analysis of the feed; feed flow; and operating specifications $H_D$ and $L_B$. When feed composition and/or feed flow changes, a new value of bottom product flow is computed and the computed value of bottom product flow rate is gradually forced upon the column in a predictive manner.

There is one practical consideration which must be made when applying Equation 9 to an operating column. This consideration arises when feed flow F and bottom product flow B are measured in volume per unit time. Equation 9 assumes the volume flows B and F are at the same temperature. If they are not at the same temperature, compensation is necessary. One method of compensating requires that bottom product flow B be referred to feed temperature by multiplying the right side of Equation 9 by the quantity:

$$1 + K_B \Delta T'' \quad (10)$$

where:

$K_B$=coefficient of thermal expansion (change in volume/ unit volume/° F.)
$\Delta T'' = T_{B2} - T_{F1}$
$T_{B2}$=temperature of bottom product at point where distillate flow is measured (° F.)
$T_{F1}$=temperature of feed at point where feed flow is measured (° F.)

Equation 9 with the necessary compensation becomes:

$$B = F(1 + K_B \Delta T'') \frac{K_8 - C_3 - iC_4 - nC_4}{K_9} \quad (11)$$

where:

$B$=volume flow rate of bottom product at existing temperature

Referring now to FIGURE 1, the feed composition information needed in the solution of Equation 11 can be supplied from analyzer 67 to bottom flow computer 101 by signal line 102. The temperature $T_{B2}$ of the bottom product and the temperature $T_{F1}$ of the feed are detected by thermocouples 103 and 104, respectively, and transmitted to computer 101, as is the feed flow rate signal from flow transducer 63 associated with feed line 12. In addition, the product specifications $H_D$ and $L_B$ are dialed into the computer 101. The computed bottom product flow rate B is transmitted as an output signal 105 by computer 101 to a biasing device 106 such as a conventional summing relay. The biasing device 106 accordingly produces an output signal 108 which serves as the setpoint for flow controller 61 of the bottom product line 36.

Computer 101 can be any suitable digital or analog means capable of computing the bottom flow rate from the input variables as expressed in Equation 11. A suitable computer and a method for calculating the bottom flow rate is described and claimed in copending Ser. No. 189,375, filed Apr. 23, 1962, United States Patent Number 3,296,097, issued Jan. 3, 1967.

As described hereinbefore, the internal reflux computer is utilized in a predictive manner to control the internal reflux. Since predictive controls as such may often only be approximate and not exact, we prefer to override the control operation with feedback control. To achieve this feedback control, referring again to FIGURE 1, we prefer to analyze the bottom product in line 36 by means of analyzer 116 to determine the concentration of the light key component, e.g., normal butane. Analyzer 116 can be a chromatographic, infrared, or ultraviolet analyzer, or the like, or a mass spectrometer, or any other suitable analyzer which will measure the concentration of the component and provide a signal representative thereof. Analyzer 116 produces an output signal corresponding to the concentration of the light key component, e.g., normal butane. The signal representing the light key component concentration in product line 36 is transmitted to a controller 117, such as an analyzer recorder controller, where it is compared with a setpoint signal proportional to $L_B$ producing an output signal 107.

Where the overhead product purity is of more importance than the bottom product purity, analyzer means can analyze the overhead product to determine the concentration of the heavy key component therein, and the difference between this measurement and $H_D$ can be used to override the computed bottom flow signal 105.

According to the invention, a bias signal is applied to signal 107 to prevent over or under correction from that signal. Without the bias signal, the correction factor would be added to the computed signal until the column had an opportunity to adjust to the correction. If the correction were too large, the column would tend to overcorrect and the adjustment would change in the other direction. This cyclic activity of the column is undesirable because the column composition deviations will eventually exceed the specified purity limit as the cycling increases.

For the system shown in FIGURE 1, if the fraction light key component in the bottom product is expressed as:

$$L_B = f_1\left(\frac{V}{L}, L, F_c\right) \quad (12)$$

where:

$V/L$=vapor-to-liquid ratio in the bottom section of the column
$L$=liquid flow in the bottom section of the column
$F_c$, $L_B$ as defined above then it can be shown that the process gain within the feedback control loop (change in the output of the process portion of the loop gain, which can be expressed in this system as $\Delta L_B$, for a change in the input to the process portion of the loop gain, which can be expressed in this system as $\Delta\theta$ or signal 107′) is:

$$\text{Process gain} = \frac{\Delta L_B}{\Delta\theta} = \frac{1}{Lf_2(\Delta L_B, L_B, L, F_c)} \quad (13)$$

where: $\theta$ is signal 107′.

Therefore, the magnitude of a change in $L_B$ caused by a change in the feedback apparatus, $\Delta\theta$, is a function of many variables. In the absence of a signal corrective means between signals 107 and 107′, if the feedback control is tuned for a given set of variables and the process conditions change such that the denominator of Equation 13 decreases, over-all loop gain will increase and the control loop will become oscillatory. If the process variables change such that the denominator of the expression (13) increases, loop gain will decrease and control quality will be poor.

According to the invention, we modify the feedback signal 107 such that the loop gain is substantially constant for any given set of process conditions. This modification can be done by using known measurements.

Thus, analyzer feedback signal 107 is modified by a value G such that $\Delta L_B / \Delta\theta_0$ is equal to a constant, where $\Delta\theta_0$ represents a change in signal 107. G is selected by substituting G into the Formula 12 and setting the expression equal to a constant $K_{10}$, the desired loop gain. Solving Equation 13 for G gives the following equation:

$$G = K_{10} L f_2(\Delta L_B, L_B, L, F_c) \quad (14)$$

Equation 14 can often be simplified by the following approximation:

$$L_B = A_{31} + A_{32}\frac{V}{L} \quad (15)$$

wherein $A_{31}$ and $A_{32}$ are constants.

The process gain becomes:

$$\frac{\Delta L_B}{\Delta\theta} = -\frac{A_{32}}{L} \quad (16)$$

The liquid flow L may be computed from:

$$L = R_I + F[1 + K(\Delta T - \delta)] \quad (17)$$

where:

$\Delta T$=temperature difference between the feed and the feed tray vapor
$K$=specific heat of the feed/heat of vaporization of the feed
$\delta$=difference between the feed dew point and the bubble point However, since $K(\Delta T - \delta)$ is often very small, the process gain may be closely approximated by setting $K(\Delta T - \delta) = 0$. The resulting equation is:

$$\frac{\Delta L_B}{\Delta\theta} = -\frac{A_{32}}{R_I + F} = -\frac{A_{32}}{F\left(\frac{R_I}{F} + 1\right)} \quad (18)$$

and the function G necessary to make $$\frac{\Delta L_B}{\Delta\theta} = K_{10}$$

is:

$$G = \frac{K_{10}}{A_{32}} F\left(\frac{R_I}{F} + 1\right) = K_{11} F\left(\frac{R_I}{F} + 1\right) \quad (19)$$

where $K_{11}$ is a constant equal to $K_{10}/A_{32}$. Thus, it can be seen that only two variables are required to calculate G. The variables, $R_I$ and F, have been heretofore measured. Thus, a signal representative of F and $R_I$ can be taken from transmitter 63 (via line 74 and 124) and computer 66, respectively, and fed to a separate computer wherein G is computed or G can be separately determined in computer 66 and a signal representative of G can be applied to signal 107.

Referring now to FIGURE 1, a signal representative of $R_I/F$ is taken from computer 66 via signal line 72 and passed through line 122 to computer 120. A signal representative of F is taken from signal line 74 and passed through signal line 124 to computer 120 which is adapted to solve the Equation 19. A signal representative of G is fed through signal line 126 to biasing means 118 which is adapted to multiply the signal G in line 126 by the signal in line 107 to produce a modified overriding signal 107′. This overriding signal 107′ is then added to the computed bottom signal 105 in 106. The output from bias relay 106 can be expressed as follows:

$$B'_c = K_{12} + B \quad (20)$$

where $B'_c$ is the output signal from 106 and $K_{12}$=signal 107′. The output from bias 106 is transmitted through signal line 108 to flow controller 61 wherein the computed bottom flow rate is compared with the measured bottom flow rate and valve 37 adjusted accordingly to maintain the computed, corrected, bottom flow rate.

In a system wherein $R_I/F$ is maintained substantially constant, the computation of G can be somewhat simplified as seen in Equation 21:

$$G = K_{13} F \quad (21)$$

where $K_{13}$ is constant equal to $$K_{11}\left(\frac{R_I}{F} + 1\right)$$

Thus, G can be calculated from F and computer 120 need only be adapted to solve Equation 21.

In FIGURE 2, there is shown an embodiment of the invention in which the product flow is calculated for overhead product stream 33. All equipment is the same except that different means have been used to control the streams. In this embodiment, liquid level controller 49 in accumulator 28 is used to control the rate of steam addition to column 11 through line 19 by adjusting flow recorder controller valve 57 which in turn adjusts valve 23. Level controller 65 is used to control the rate of bottom product removal through line 36 by adjusting flow recorder controller 61 which in turn adjusts valve 37 in accordance with the level of liquid in the bottom portion of column 11. In this embodiment, operations computer 156 has been substituted for computer 66 and computer 101 of FIGURE 1. Computer 156 is adapted to solve Equation 5 as done by computer 66 in the description of FIGURE 1. Accordingly, a signal representative of the desired flow rate of reflux in line 31 is sent via signal line 166 to flow recorder controller 158 which in turn adjusts valve 32 to give the desired reflux flow through line 31.

Further, computer 156 is adapted to solve Equation 22 (below) which is an equation for the product flow rate through line 33 derived according to the method disclosed and claimed in U.S. 3,224,947, Lupfer, the equation being derived in accordance with that method set forth hereinbefore with relation to the bottom product flow rate.

$$D = F(1 + K_{23}\Delta T''') \left( \frac{C_3 + iC_4 + nC_4 - K_{23}}{K_{24}} \right) \quad (22)$$

wherein $\Delta T'''$ is equal to $T_{O1} - T_{F1}$ $T_{O1}$ is equal to the temperature of the overhead product at a point where the overhead flow is measured $T_{F1}$ is equal to the temperature of the feed at a point where the feed flow is measured (° F.)

$K_{23}$ is equal to $L_B$ $K_{24}$ is equal to $1 - H_D - L_B$

D is equal to the volume flow rate of overhead product at the existing temperature Briefly, the flow rate for stream 33 is calculated in computer 156 from Equation 22 and a signal representative of the calculated flow rate is used to set the rate of flow in line 33. An analyzer provides a feedback control to bias the calculated overhead flow rate signal from the computer and the analyzer loop gain ($\Delta H_D/\Delta \theta_1$) is maintained constant by applying a computed factor to the analyzer signal used to bias the predictive control signal. Referring to FIGURE 2, computer 156 calculates the overhead flow rate to feed flow rate ratio, $D_C/F$, and passes a signal proportional to the same through line 162 to computer 154. The signal in line 162 is biased by an analyzer signal obtained from analyzing the overhead in analyzer 116 and comparing the analysis obtained therein with a desired analysis set in analyzer recorder controller 150. A signal proportional to the difference between the desired concentration and the analyzed concentration is sent through line 152 to computer 154 in which the signal is biased by a corrective factor G′ which maintains the gain of the feedback loop constant. The signal in line 152, representative of the corrective factor, modified by G′, is added to the signal in line 162 and a composite signal is multiplied by feed rate signal in 160, and passed through signal line 168 to flow recorder controller 48 which sets the flow of distillate product through line 33.

The bias signal applied to signal 152 can be computed from Equation 23:

$$G' = K_{15} F \left( \frac{R_I}{F} \right) \quad (23)$$

where $K_{15}$ is a constant embodying the desired analyzer loop gain in a manner analogous to $K_{11}$ of Equation 19 or $K_{13}$ of Equation 21. This equation assumes a proportional relationship between $H_D$ and $(V/R_I)$. The compensation actually holds $$\frac{\Delta \frac{V}{R_I}}{\Delta \theta_1}$$

constant. Thus, a signal proportional to $R_I/F$ is transmitted via signal line 164, and a signal representative of the flow rate, F, is transmitted via line 160, all signals going to computer 154.

With reference to FIGURE 3 which shows the schematic operation of computer 154, the signal $K_1 R_I/F$ produced in multiplier 180 is multiplied by a signal $\theta_1 - K$ obtained from adder 186. Adder 186 is set at a value K=the midpoint of the output of analyzer recorder controller 150. A composite signal 188 is added in adder 190 to a signal proportional to $D_C/F$ to produce a signal proportional to $D/F$. The signal from 190 is multiplied by F in multiplier 194 to produce output signal D in line 168.

Whereas the invention has been described with relation to maintaining constant a change in concentration of a key component with respect to change in analyzer recorder controller signal, it is obvious that other gains can be held constant according to the invention. For example, $$\frac{\Delta \left( \frac{R_I}{V} \right)}{\Delta \theta_1}$$

can be maintained constant. With regard to FIGURE 1, $$\frac{\Delta \left( \frac{V}{L} \right)}{\Delta \theta_0}$$

can be maintained constant. Or, for example, $$\frac{\Delta \left( \frac{L}{V} \right)}{\Delta \theta_0}$$

could be maintained constant. The proper compensation could be determined for any of the above ratios. The over-all control system should be so compensated that the analyzer recorder controller feedback loop maintains a constant gain.

Where as the invention has been described with regard to a simple fractional distillation column in which an overhead product has been separated from a bottom product, the invention could also be applied to a multicomponent fractional distillation column in which a plurality of product streams are obtained. A suitable method and apparatus for controlling such a fractional distillation column to which the invention could be applied is described and claimed in copending application Ser. No. 510,277, filed Nov. 29, 1965.

Reasonable variation and modification are possible within the scope of the foregoing disclosure, the drawings, and claims to the invention without departing from the spirit thereof.

We claim:

1. In a fractionation process wherein a feed is passed to a fractional distillation zone; an overhead product is removed through a first overhead stream and cooled to condense at least a portion of said overhead product; a first portion of said condensed overhead product is passed back to the top portion of said fractional zone as a reflux stream; a second portion of said condensed overhead product is removed as an overhead product stream; a bottom product is removed from the lower portion of said fractional distillation zone as a bottom stream; the flow rate of at least one of said product streams is predicted by analysis of the conditions existing within said fractional distillation zone, the characteristic operating parameters of the particular fractional distillation zone being used, and the most favorable operating conditions for producing the desired product; a first signal representative of the predicted flow rate of a product stream is used to adjust the rate of flow of its respective stream; at least one of said streams is analyzed for a key component; the measured concentration of said key component is compared with a desired fixed concentration of said key component; a second signal representative of the difference between said measured concentration and said desired fixed concentration is used to provide an overriding feedback signal for said first signal; the improvement which comprises biasing said second signal with a third signal which is varied to maintain a constant relationship between the magnitude of said second signal and said measured concentration.

2. A process according to claim 1 wherein the rate of heat required for said zone is computed and a heat input source to said zone is controlled in accordance with said computation.

3. A process according to claim 2 wherein said heat input source is said first portion of said condensed overhead stream, a desired rate of flow of said first portion is calculated to maintain a proper internal reflux rate, and the rate of said first portion is adjusted in accordance with said calculated value.

4. A fractionation process according to claim 1 wherein the flow rate of said bottom product stream is predicted in a computing zone, and said third signal is proportional to the quantity $$F\left(\frac{R_I}{F}+1\right)$$

wherein F is the volume flow rate of feed, and $R_I$ is the internal reflux.

5. A fractionation process according to claim 1 wherein the flow rate of said bottom product stream is predicted and said third signal is proportional to the feed flow rate to said defractionation zone.

6. A process according to claim 1 wherein the desired flow rate of said overhead product stream is predicted and said third signal is proportional to $$F\left(\frac{R_I}{F}\right)$$

wherein F is the feed flow rate to said fractional distillation zone and $R_I$ is the internal reflux within said fractionation zone.

7. A process according to claim 6 wherein the flow of said bottom product from said zone is controlled in accordance with the liquid level in the bottom portion of said zone, and a rate of heat addition to said zone is controlled in accordance with the liquid level in an accumulator zone which collects said condensed overhead stream.

8. In a control system for a fractional distillation column wherein there is provided:
(a) a first conduit means for supplying feed to said column,
(b) a second conduit means for removing overhead from said column,
(c) means for condensing said overhead,
(d) fourth conduit means for returning a first portion of said condensed overhead to the top portion of said column as reflux therefor,
(e) a fifth conduit means for removing a second portion of said condensed overhead as a product,
(f) a sixth conduit means for removing a bottom product from a bottom portion of said column,
(g) a first computing means for calculating the desired flow rate of product in one of said fifth conduit means and sixth conduit means,
said computing means being adapted to produce a first signal representative of said computed product flow rate,
(h) an analyzer means for measuring the concentration of a key component in one of said fifth conduit means and said sixth conduit means,
said analyzer means being capable of delivering a second signal proportional to said concentration of said key component,
(i) comparing means connected to said analyzer means to compare said measured concentration of said key component with a desired concentration, said comparing means producing a third signal representative of the difference between said desired signal and said measured signal, the improvement which comprises:
(1) a second computing means to establish a fourth signal when applied to said third signal will result in a constant relationship between said third signal and said measured concentration,
(2) means for applying said fourth signal to said third signal to produce a fifth signal,
(3) means for adding said fifth signal to said first signal to produce a sixth signal representative of said rate of product flow, and
(4) means for adjusting said product flow in accordance with said sixth signal.

9. An apparatus according to claim 8 wherein the flow rate of overhead product in said fifth conduit means is computed and said fourth signal is determined according to the equation:

$$G=K_{15}F\left(\frac{R_I}{F}\right)$$

wherein G is the value represented by said fourth signal, $K_{15}$ is a constant representative of the operating parameters of said distillation column, F is the feed flow rate to said fractional distillation column, and $R_I$ is the internal reflux within said fractional distillation column.

10. An apparatus according to claim 8 wherein the flow rate of bottom product in said sixth conduit is computed and said fourth signal is determined according to the equation:

$$G=K_{11}F\left(\frac{R_I}{F}+1\right)$$

wherein G is the value of said fourth signal, $K_{11}$ is a constant representative of the operating parameters of said fractional distillation column, F is the volume flow rate of feed, and $R_I$ is the internal reflux.

11. An apparatus according to claim 8 wherein the flow rate of overhead product in said fifth conduit means is computed and said fourth signal is proportional to $$F\left(\frac{R_I}{F}\right)$$

wherein F is the feed flow rate to said fractional distillation column and $R_I$ is the internal reflux within said fractionation column.

12. An apparatus according to claim 8 wherein the flow rate of bottom product in said fifth conduit is computed and said fourth signal is proportional to $$F\left(\frac{R_I}{F}+1\right)$$

wherein F is the volume flow rate of feed to said fractionation column and $R_I$ is the internal reflux within said fractionation column.

References Cited

UNITED STATES PATENTS

| 3,224,947 | 12/1965 | Lupfer | 196—132 |
| 3,255,105 | 6/1966 | Murray | 196—132 |
| 3,296,097 | 1/1967 | Lupfer | 203—2 |
| 3,361,646 | 1/1968 | MacMullen et al. | 203—2 |

OTHER REFERENCES

Buckley, P. S.: Techniques of Process Control, New York, 1964, pp. 61–74 relied upon.

WILBUR L. BASCOMB, JR., *Primary Examiner.*

U.S. Cl. X.R.

202—160; 196—132; 203—12; 235—151.12

UNITED STATES PATENT OFFICE

CERTIFICATE OF CORRECTION

Patent No. 3,449,215                            June 10, 1969

Merion L. Johnson et al.

It is certified that error appears in the above identified patent and that said Letters Patent are hereby corrected as shown below:

Column 15, line 27, "defractionation" should read -- fractionation --. Column 16, line 6, after "signal" insert -- which --.

Signed and sealed this 24th day of March 1970.

(SEAL)
Attest:

Edward M. Fletcher, Jr.                      WILLIAM E. SCHUYLER, JR.
Attesting Officer                                Commissioner of Patents